(12) United States Patent  
Cazals et al.

(10) Patent No.: US 8,360,357 B2
(45) Date of Patent: Jan. 29, 2013

(54) AIRCRAFT WITH A WING MOVABLE ALONG THE LONGITUDINAL AXIS OF THE FUSELAGE

(75) Inventors: Olivier Cazals, Daux (FR); Thierry Druot, Saint Jean (FR)

(73) Assignee: Airbus Operations SAS, Toulouse (FR)

( * ) Notice: Subject to any disclaimer, the term of this patent is extended or adjusted under 35 U.S.C. 154(b) by 256 days.

(21) Appl. No.: 12/789,845

(22) Filed: May 28, 2010

(65) Prior Publication Data

US 2011/0036941 A1 Feb. 17, 2011

(30) Foreign Application Priority Data

May 29, 2009 (FR) ...................................... 09 53577

(51) Int. Cl.
*B64C 3/38* (2006.01)
*B64C 1/26* (2006.01)
(52) U.S. Cl. .................. 244/46; 244/45 R; 244/3.26
(58) Field of Classification Search .................. 244/46, 244/45 R, 39, 38, 201, 7 R, 3.26
See application file for complete search history.

(56) References Cited

U.S. PATENT DOCUMENTS

| 1,916,813 | A | * | 7/1933 | Sessa ............................... 244/46 |
| 3,181,820 | A | * | 5/1965 | Burnelli ........................... 244/87 |
| 3,493,197 | A | * | 2/1970 | Spearman ........................ 244/46 |
| 5,031,857 | A | * | 7/1991 | MacConochie et al. ........ 244/46 |

* cited by examiner

*Primary Examiner* — Tien Dinh
*Assistant Examiner* — Richard R Green
(74) *Attorney, Agent, or Firm* — Perman & Green, LLP (57) ABSTRACT

An aircraft has a fuselage a wing integral with the fuselage at a point on a rigid central wing box. Sections of the wing are located on sides of the central wing box and integral and fixed relative to the wing box to form a rigid wing. The wing is mounted movably in translation relative to the fuselage along a longitudinal direction of the aircraft parallel to an axis of the fuselage between an extreme forward position and an extreme rear position of a point of reference of the wing. The central wing box is determined in the front by a wing box front spar, in the rear by a wing box rear spar, and laterally by root ribs. Sections of the wing include external front and external rear spars integral with and fixed relative to the wing box front spars and wing box rear spars to form the rigid wing.

13 Claims, 7 Drawing Sheets

AIRCRAFT WITH A WING MOVABLE ALONG THE LONGITUDINAL AXIS OF THE FUSELAGE

CROSS-REFERENCE TO RELATED APPLICATIONS

This application claims priority to and the benefit of French Application No. 09 53577 filed on 29 May 2009, the disclosure of which is incorporated by reference in its entirety.

BACKGROUND

The aspects of the disclosed embodiments belong to the field of transport aircraft such as civilian aircraft or military transport aircraft.

More particularly, the aspects of the disclosed embodiments relate to an aircraft architecture that provides improved precise control of the longitudinal balance of the aircraft.

For reasons of performance, stability, and control, an aircraft must respect certain constraints between the relative positions along the longitudinal axis, the center of gravity of the aircraft, and characteristic points of the aircraft aerodynamics.

When balanced in level flight, not only does the center of aerodynamic thrust have to correspond to the center of gravity of the aircraft, but the position of the different aerodynamic foci relative to the balance in pitch has to be situated both rather close to the center of gravity and in general behind this center of gravity.

Behind it for reasons of natural stability and to guarantee the possibility of piloting the aircraft in case of the failure of any system for increasing longitudinal stability, and close enough for reasons of performance while avoiding large setting angles of the horizontal stabilizers, a source of aerodynamic drag, to ensure the longitudinal balance of the aircraft.

These phenomena are perfectly known to the aircraft designers who nevertheless have to take into account the fact that the position of the center of gravity is variable for a given aircraft, in particular because of the loading of the aircraft, which cannot always be totally controlled, for example the number and placement of the passengers for civilian passenger transport aircraft, and during a mission because of the fuel consumption during the flight as well as the displacements of the aerodynamic foci depending on the Mach number of the flight from compressibility phenomena.

To respond to these requirements, a method, historically the oldest, consists of defining the aircraft, its geometry, and the allowed positions of the center of gravity or allowed region of centering, so that the aircraft has acceptable flight characteristics under all conditions that it may encounter in flight.

In this type of aircraft, the longitudinal balance of the aircraft around the pitch axis is ensured by the horizontal stabilizer whose setting angles permit the application of aerodynamic lift forces upward or downward to compensate for the torque resulting from the shifting of the center of thrust from the lift of the wing relative to the center of gravity, which are both developments in the longitudinal direction of the aircraft that depend on the mission and the flight path.

To take advantage of the performance of modern systems, some aircraft also make use of fuel transfer during flight between the principal reservoirs in the wings and auxiliary reservoirs in the rear section of the aircraft distant from the wings, in particular in the rear horizontal stabilizer, to displace the position of the center of gravity of the aircraft.

This method of managing the center of gravity is relatively effective because the auxiliary reservoirs of the rear fins are distant from the center of gravity and benefit from a substantial lever arm.

However, this solution has the drawback of making the fuel system more complex, and makes it necessary to make the structure of the fin tight to serve as a reservoir, and to add pipes and transfer pumps.

This solution is also limited by the volume that can be contained by the rear fins, or by an additional fuselage reservoir, as the case may be.

Furthermore, when the fuel has to be consumed and it no longer permits providing the function of controlled displacement of the center of gravity, it is accordingly necessary to consider the aircraft in the situation in which the fuel ensemble will be consumed, which limits the capabilities of such a system relative to what would theoretically be possible, and in particular it is not possible in practice to reduce the dimensions of the fins even if the position of the center of gravity relative to the aerodynamic foci were perfectly controlled.

SUMMARY

To avoid the drawbacks of the known solutions for static balancing an aircraft in pitch, or at least to limit the drawbacks, an aircraft according to the disclosed embodiments has means for displacing the wing longitudinally relative to the fuselage.

The aircraft in a known fashion has a fuselage, a wing integral with the fuselage, for example in a middle section in the longitudinal direction of the fuselage, and in a high or low position on the fuselage, and an ensemble of fins integral with the fuselage.

According to the disclosed embodiments, the wing is mounted to be movable in translation relative to the fuselage along a longitudinal X direction of the aircraft essentially parallel to an axis of said fuselage between an extreme forward position Xav and an extreme rear position Xar of a point of reference of said wing, so that the center of gravity of the aircraft can be displaced longitudinally to be positioned precisely at any time during flight relative to the point of application of the resultant of the aerodynamic lift forces of the aircraft without tail assembly.

The movable linkage between the wing and the fuselage is provided by a central wing box of the wing determined principally in front by a front spar, in the rear by a rear spar, and laterally by wing root ribs that form a rigid structure of the section of the wing passing through the fuselage.

To obtain the structural strength and rigidity associated with the sole allowed longitudinal displacement, the wing is mounted to be movable relative to the fuselage by at least two parallel beams essentially parallel to the longitudinal axis of the fuselage, and preferably these beams are integral with the fuselage at least at the points of a strong forward bulkhead of the fuselage located in front of the central wing box and of a strong rear bulkhead of the fuselage located behind the central wing box.

The beams pass through the central wing box through openings in the front and rear spars that allow the longitudinal sliding of the airfoil without increasing the height necessary to keep the wing integral with the fuselage, and that guarantees that the wing remains integral with the fuselage in case of any failure of the sliding system at least as long as the wing maintains its structural integrity.

To allow the longitudinal sliding in the X direction without displacement in the other directions, the means of guidance integral with the central wing box and resting on the beams allows the motion of the wing toward the front and toward the rear without noticeable displacement in the vertical or lateral directions of the aircraft, in particular ensuring that the means of guidance have sufficient tension of the beams and mechanisms for absorbing functional play.

In an example of embodiment that guarantees keeping the forces in service, maintaining low functional play and minimum risk of blockage, the means of guidance has rollers integral with structures of the central wing box and resting on the beams.

Such rollers permit the absorption of major forces and realizing structural designs with redundancies necessary to guarantee the level of safety desired for such a linkage between the wing and the fuselage of an aircraft.

In an embodiment, the beams are rectangular sections and rollers with essentially vertical axes provide the lateral guidance of the wing while rollers with essentially horizontal axes provide the vertical guidance of the wing by permitting longitudinal displacement.

For example, each of two beams passes through a secondary wing box of the central wing box between a root rib and an internal rib on which are fastened all or part of the means of guidance.

The secondary wing boxes provide for making a reinforced and rigid central wing box structure on which the means of guidance are beneficially fastened.

To provide for the displacement of the wing relative to the fuselage during flight, at least one driver, integral at a first extremity with the central wing box and at a second extremity with a structure of the fuselage, provides for displacing and holding the wing in position relative to the fuselage.

To absorb effectively the forces to pass between the wing and the fuselage along the longitudinal X direction, the driver or drivers are integral with a front support frame of the fuselage located in front of the front bulkhead for a driver whose first extremity is integral with the central wing box at the point of the front spar, and/or are integral with a rear support frame of the fuselage located behind the rear bulkhead for a driver whose first extremity is integral with the central wing box at the point of the rear spar.

To benefit from the advantages provided by bringing together the center of gravity of the aircraft and the point of application of the aerodynamic lift force of the aircraft without tail assemblies, the extreme forward and rearward positions Xav and Xar, respectively, of the point of reference of the wing relative to the fuselage, are such that the center of gravity of the aircraft and the point of the aerodynamic lift force of the aircraft without tail assemblies can be maintained along the longitudinal X direction at an essentially constant distance Dgp regardless of the loading of the aircraft (1) and the allowed position of flight of the aircraft from the flight domain, and the distance Dgp is preferably such that the aerodynamic lift force of the lift surface of a horizontal stabilizer of the tail assembly is essentially zero for the needs of static longitudinal balancing in pitch around an axis parallel to the Y axis of the aircraft.

When the conditions are thus met to reduce significantly the area of the horizontal stabilizer relative to a conventional design, the horizontal stabilizer is advantageously composed of monobloc saber rudders hinged relative to the fuselage, with these rudders being dimensioned by criteria of control and dynamic stability of the aircraft, and with the saber rudders providing for reduction of the aerodynamic drag of the fins.

The aircraft pursuant to the disclosed embodiments is described with reference to the Figures, which show schematically:

BRIEF DESCRIPTION OF THE DRAWINGS

FIG. 3b: a profile of the sectional view of FIG. 3a;

FIG. 4b: a view from above of the sectional view of FIG. 4a;

DETAILED DESCRIPTION

FIG. 1 and FIGS. 2a, 2b, and 2c illustrate an example of an aircraft 1 pursuant to the disclosed embodiments that has principally a fuselage 2, a wing 3 carrying jet engines 5 fastened beneath the wing, and a tail assembly 4 fastened to the fuselage in a section of the fuselage behind the wing 3.

The aircraft 1 is associated for the needs of the description with a conventional frame of reference defined by three orthogonal directions:

an X direction parallel to a longitudinal axis of the aircraft, parallel to an axis of the fuselage, oriented positively toward the front of the aircraft in the direction of motion in flight;

a Z direction perpendicular to the X direction and oriented positively downward;

a Y direction perpendicular to a plane XZ determined by the X and Z directions, oriented positively toward the right.

The expressions relative to position or direction accordingly have the common meanings that they are in a frame of reference of the aircraft, specifically:

in front of or toward the front signifies in the direction of positive X, and behind or toward the rear in the direction of negative X;

below or downward signifies in the direction of positive Z, and above or upward in the direction of negative Z;

on the right or toward the right signifies in the direction of positive Y, and on the left or toward the left in the direction of negative Y, on a side signifying either the side of positive X or negative X, depending on the case.

The aircraft 1 of the disclosed embodiments in the example illustrated has a general architecture of a transport aircraft with high wing.

The fuselage 2 is an elongated fuselage that has principally a more or less long and essentially cylindrical central section 21, with a circular cross section in the example illustrated, and with an axis parallel to the longitudinal X axis of the aircraft 1.

The central section 21 is prolonged at the front by a developed forward section 22 called the front tip, in which is located the cockpit of the aircraft, and at the rear by a rear developed section called the rear tip, in which the cross sections along a vertical plane normal to the longitudinal X axis diminish gradually, to a reduced rear extremity cross section that is small compared to the cross sections of the central section of the fuselage.

The wing 3 is mounted in the top part of the fuselage 2 in a middle area of the fuselage 2 in the X direction.

The wing 3 is also mounted on the fuselage 2 movably in the X direction between an extreme forward position Xav and an extreme rearward position Xar, so that the position of the wing between Xav and Xar can be chosen and modified during a flight of the aircraft.

The term "flight of the aircraft" here should be considered in its broad meaning, in other words from a point of departure at the terminal to a point of arrival associated with turning off the engines.

The engines 5 of the aircraft, two engines arranged symmetrically relative to a vertical XZ plane of symmetry of the aircraft in the example illustrated, are advantageously fastened beneath the wing 3 by support masts in a conventional manner.

The aircraft 1 is advantageously provided with landing gear, not shown, fastened to the fuselage 2 in a known manner.

It is advantageous to fasten the landing gear to the fuselage on aircraft that have a wing mounted above the fuselage for reasons of the greatest simplicity and a gain of weight that this combination of solutions presents, and also in the case of the disclosed embodiments the introduction of supplementary forces in the wing 3 movable relative to the fuselage 2 is thus avoided.

Figure 1:
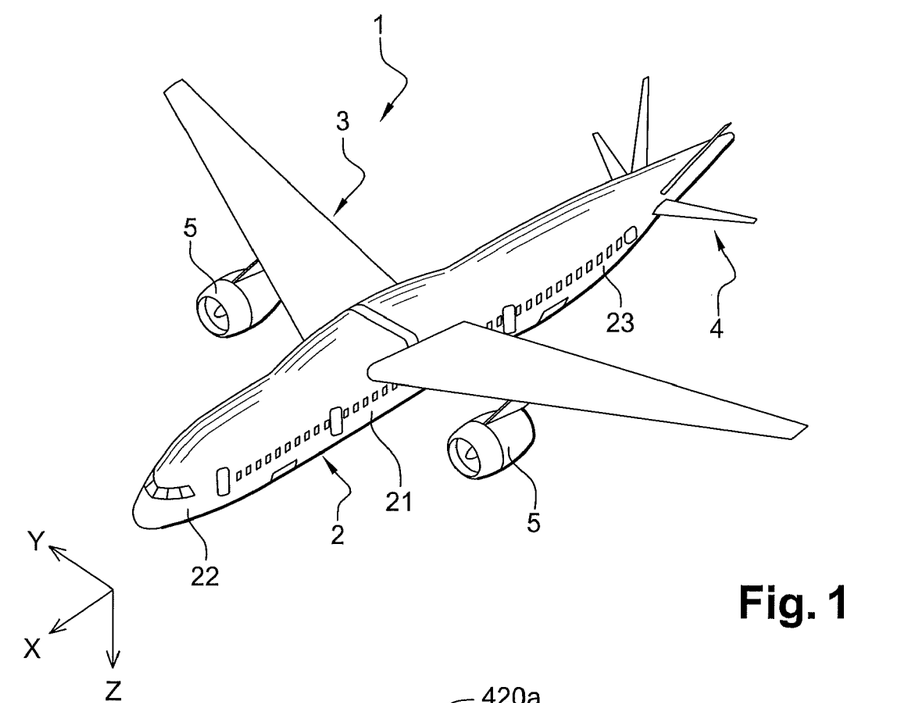
FIG. 1: a perspective view of an example of an aircraft pursuant to the disclosed embodiments in cruising flight configuration.
Figure 1A:
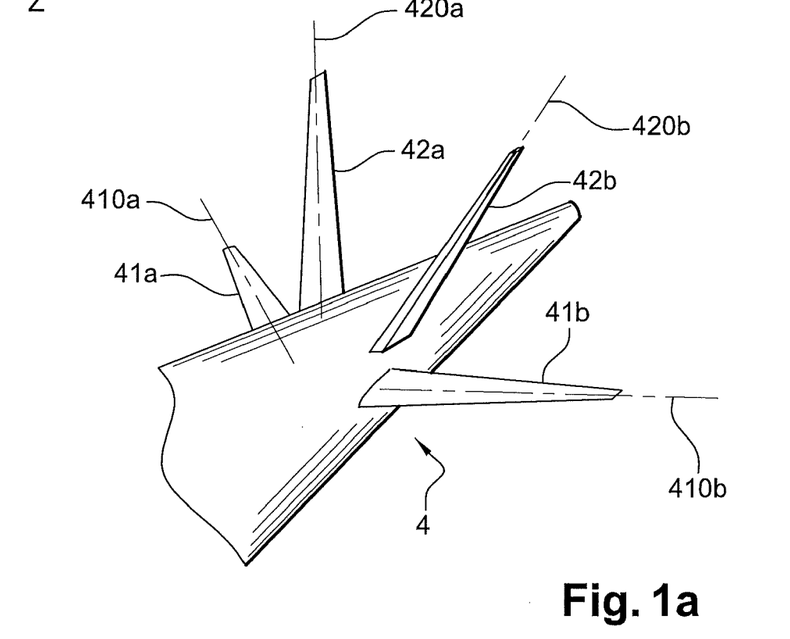
FIG. 1a: a detail of the rear section of the aircraft of FIG. 1 illustrating in perspective the tail fin assembly.
Figure 2A:
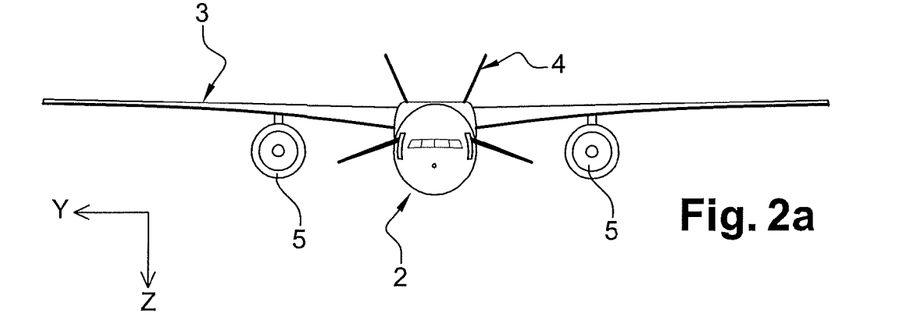
FIGS. 2a, 2b, 2c: front, profile, and bottom views of the aircraft of FIG. 1.
Figure 2B:
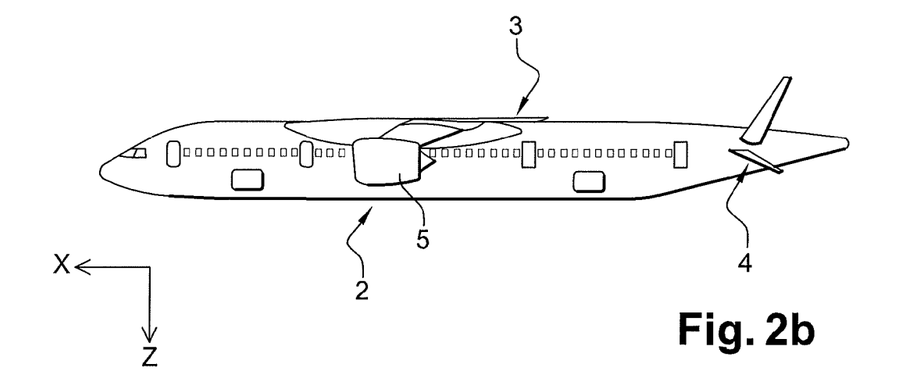
Figure 2C:
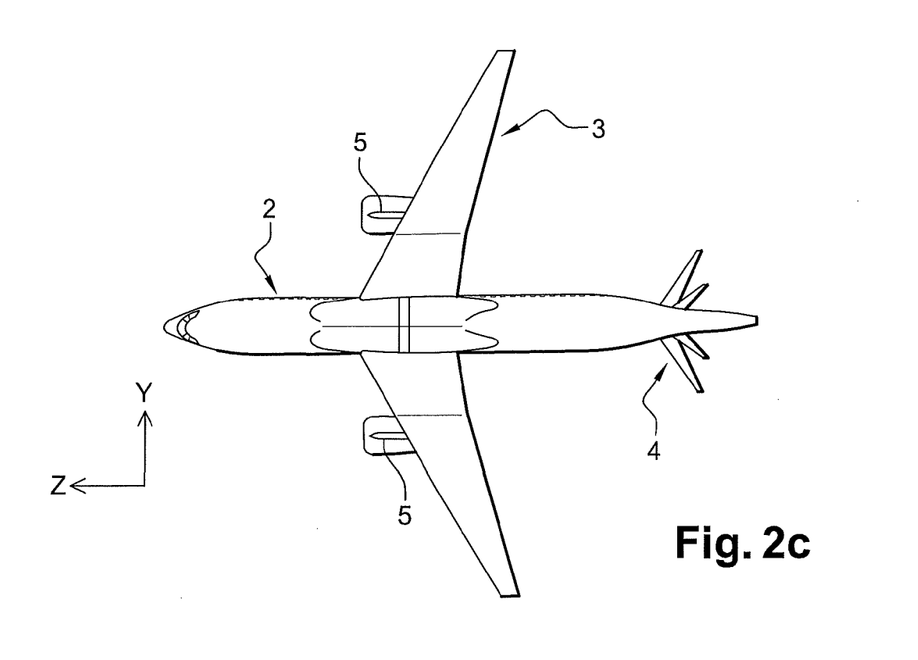

The tail assembly 4, as illustrated in the detail of FIG. 1a, has four saber rudders 41a, 41b, 42a, 42b, fastened on the rear tip 23, some of whose characteristics will be described later.

In an aircraft in flight, the tail fins produce an aerodynamic drag that is higher on the one hand when the area of the fins is greater, because of the effect of the surface on the frictional drag, and on the other hand when the lift of a fin is greater, because of the drag induced, which is itself sensitive to the geometric elongation of the fin.

One of the principal functions of the fins, for the horizontal pitch control stabilizers, is the longitudinal balance of the aircraft, the vertical components of the aerodynamic forces on the fins being determined to compensate for the pitch torque around an axis parallel to the Y axis linked to the difference in position along the X axis between the point of application of a lift force of the aircraft without tail assembly, the vertical component of the resultant of the aerodynamic forces generated by the wing 3 and to a lesser extent by the fuselage 2 and the jet engines 5, and the center of gravity of the aircraft.

According to the disclosed embodiments, the wing 3 is displaced along X so that the lift forces developed constantly by the horizontal fin are reduced as much as possible, in other words they are essentially zero or at least at a desired value.

To this end, the wing is displaced toward the front or toward the rear on the fuselage, on the one hand depending on the distribution of load in the fuselage, which determines the position of the center of gravity of the fuselage and which varies from mission to mission of the aircraft, and on the other hand depending on the quantity and distribution of the fuel in the wing reservoirs, which determines the position of the center of gravity of the wing and which varies during the mission.

Each model of aircraft is specific, in line with its dimensions and its missions, but by a combination of the fuselage and wing loading diagrams, it is possible for one skilled in the art to determine during the design of a particular model of aircraft the extreme forward and extreme rearward positions, Xav and Xav, respectively, that the wing 3 must be able to reach relative to the fuselage 2 to maintain the resultant center of gravity in the desired position at a distance Xgp from a point of application of the resultant of the aerodynamic lift forces of the aircraft without fins, for each flight condition encountered in the course of a mission.

The expression "aircraft without fins" must be understood in this context as an imaginary creation used in the field of aerodynamic design that permits determination of the forces that would be applied to an aircraft if it were deprived of fins on the aerodynamic level.

From optimal positioning of the wing in the X direction at any moment corresponding to an essentially constant and sufficiently small value of Xgp, the dimensions of the horizontal stabilizer can be reduced to the maximum, and with static balancing no longer being sought through the intermediary of an adjustable setting angle of the surface of a horizontal stabilizer, it is possible to use horizontal stabilizers with a reduced area compared to a design following the criteria customarily used, to meet principally the requirements of dynamic stability and pitch control of the aircraft 1.

It must be understood that the criterion fixing the position of the wing in the longitudinal X direction, as the case may be, is different depending on the phase of flight.

For example, the reduction of aerodynamic drag and accordingly of fuel consumption is an objective during the cruising phase, which leads to a position of the wing 3 corresponding to a reduced aerodynamic angle setting of lift surfaces of the horizontal stabilizer.

However, during critical phases of flight in the matter of piloting and trajectory control, takeoff or approach and landing in particular, it is advantageous to control the position of the wing along X to respect longitudinal stability criteria, by positioning the center of gravity judiciously relative to the aerodynamic foci.

Such longitudinal stability criteria are also put to use in case of piloting system failures, for example of a stability-increasing system, which would no longer guarantee the qualities of flight for an optimal position of the wing in view of the fuel consumption criteria.

The tail assembly, at least for the horizontal stabilizers 41a, 41b, is made up of at least two saber rudders.

A saber rudder is a lifting aerodynamic surface used as a greatly elongated rudder, in other words whose wingspan Be between a fuselage root and an extremity opposite the root along the rudder, is relatively large relative to an average chord length Ce of the profiles of said saber rudder.

The Be/Ce ratio or elongation of a saber rudder is typically equal to or greater than five.

Such a rudder is accordingly relatively slim, and with a given geometric surface, it presents small chord profiles and consequently it has equally small absolute thicknesses for a given relative thickness of profiles.

A characteristic that results from these reduced chord and thickness dimensions for the saber rudders of the aircraft 2 is the absence of trailing edge control, the installation of such a control and associated drivers being difficult or impossible in practice, considering the space available and the aerodynamic forces on the rudder.

Such rudders are called monobloc and are different in that respect from transport aircraft rudders generally used that have a fixed or variable-adjustment section, on which a trailing edge rudder is hinged.

Each saber rudder 41a, 41b, 42a, 42b, is hinged in one piece around an axis, respectively 410a, 410b, 420a, 420b, called the axis of rotation of the rudder as illustrated in the detail of FIG. 1a.

An axis of rotation of such a rudder is essentially in a middle plane of the rudder and extends along the wingspan of said rudder, advantageously at an essentially constant percentage of the chords of the profiles.

The means of driving the saber rudders are advantageously installed in the fuselage 2, in the examples illustrated in an unpressurized area of the rear cone 23 in which the installation of the driver is relatively simple to perform.

Such a rudder may have one or more trailing edge flaps to modify the hinge torque around the axis of rotation, trailing edge flaps called tabs that are not trailing edge rudders.

In the architecture of the aircraft of FIGS. 1 and 2a to 2c, two saber rudders 41a, 41b perform the principal function of horizontal stabilizer, and two other saber rudders perform the principal function of vertical rudder.

Preferably as illustrated, for reasons of redundancy of means of aircraft control, the saber rudders 41a, 41b of the horizontal stabilizer are not strictly in a horizontal XY plane, which allows said saber rudders to create a component of aerodynamic force on said rudders in the horizontal plane by means of an asymmetric setting configuration.

In an equivalent fashion, the saber rudders 42a, 42b of the vertical rudder are not strictly vertical and are inclined so as to form a V, which allows production of a component of aerodynamic force in the vertical plane in a non-identical setting configuration.

Because of the strong forces to transit between the fuselage 2 and the wing 3, it is essential for the means used to move said wing relative to said fuselage to be able to absorb the forces in flight under all flight configurations and conditions, while permitting the displacement of the wing between the extreme forward and rearward positions Xav and Xar, respectively, without risk of blockage and without risk of uncontrolled modification of the position of the wing.

Such a result is achieved in the aircraft 1 of the disclosed embodiments by permitting a central section 31 of the wing, called the central wing box, to slide above the fuselage 2 in a zone defined in the front by a forward bulkhead 241 and at the rear by a rear bulkhead 243, as illustrated in FIGS. 3a, 3b, 4a, 4b, and 5a to 5c.

The central wing box 31 is defined in the front by a front spar 32 and at the rear by a rear spar 33, with the front and rear spars corresponding to the structure of the wing spars 3 in the section of the wing located above the fuselage 2 between two root ribs 34a, 34b, arranged longitudinally and whose position in the Y direction corresponds essentially to a connection zone of the wing 3 with the geometry of the fuselage 2, symmetrically relative to the vertical plane of symmetry of the aircraft.

As illustrated in the cutaway Figures revealing the principal elements of the structure, the front and rear spars 32 and 33, respectively, of the central wing box are prolonged by front and rear external spars of the sections of the wing 3 located on each side of the central wing box 31. These external spars are integral with the spars of the central wing box and are fixed relative to said central wing box, with the wing 3 thus being a rigid wing at the movable sections not shown except for such parts as the flaps, air brakes, hyperlift devices, etc.

The two root ribs 34a, 34b determine the sides of the central wing box 31.

The central wing box 31 itself forms a rigid structure, with the top and bottom of the wing box, whose edges correspond to the front and rear spars 32 and 33, respectively, and to the rib roots 34a, 34b, being closed by a structural top face surface above the wing box, not shown in the Figures to be able to reveal the internal arrangement of the wing box, and by a structural bottom face surface 30 beneath the wing box, and with the ability to reinforce the wing box in a known way as necessary by internal structures or reinforcements, not shown.

The distance separating the forward bulkhead 241 from the rear bulkhead 243 along the X direction is at least equal to the distance between the front and rear spars 32 and 33, respectively, of the central wing box plus the maximum amplitude of displacement of the wing 2, in other words the value of the extreme forward position Xav minus the extreme rearward position Xar. Said distance is preferably limited to this condition, taking into account any necessary play for proper operation of devices providing for the relative displacement of the wing 3 relative to the fuselage 2, and bumpers or guards that would be judged useful.

Xav and Xar are considered for an arbitrary point of reference of the wing 3, for example a front face of the front spar 32 of the central wing box, and measured from a fixed arbitrary point of reference relative to the fuselage 2, for example the front extremity of the aircraft.

Two parallel beams 25a, 25b are integral with the forward and rear bulkheads 241 and 243, respectively, so that said beams are essentially parallel to the longitudinal X axis, or at least parallel to the desired direction of displacement of the wing 3 relative to the fuselage 2.

The beams 25a, 25b are essentially at the same position in height Z relative to the fuselage 2, and are separated in the Y direction by such a distance that the spacing of exterior plates of said beams is less than the distance available between the root ribs 34a, 34b.

The beams 25a, 25b pass through openings in the front and rear spars 32 and 33, respectively, of the central wing box to permit the displacement of the wing 3 between the two front and rear bulkheads.

The central wing box 31 advantageously has two internal ribs 35a, 35b parallel to the root ribs 34a, 34b, and each forming a secondary wing box 311a, 311b, inside the central wing box 31, with the root rib closest to it and with the front and rear spars 32 and 33, respectively, traversed by the beam from the corresponding side.

Means of guidance 36 are arranged to provide guidance for the wing 3 through the beams 25a, 25b during the displacement of the wing relative to the fuselage.

The means of guidance 37 are preferably integral with the structures forming the secondary wing boxes 311a, 311b: spars, ribs, and structural faces, with said secondary wing boxes forming structures that are reinforced to absorb the forces transmitted by the beams 25a, 25b to said means of guidance.

The means of guidance 36 hold the beams 25a, 26b so that the central wing box 31 is held without possible perceptible motion in the vertical directions, along the Z axis, and in the lateral directions, along the Y axis.

In a form of embodiment that corresponds to the examples illustrated in FIGS. 3a, 3b, 5a, and 5b in particular, each beam 25a, 25b has an essentially rectangular cross section and is held laterally by pairs of rollers on each side of the beam resting on the right and left planar faces of the beam, and is held vertically by pairs of rollers on each side of the beam resting on the upper and lower planar faces of the beam.

In an embodiment not shown, the means of guidance intended to prevent lateral displacements of the wing in the Y direction are limited either on exterior faces of the two beams 25a, 25b, or on interior faces of said two beams whose fixed separation guarantees maintaining it in the lateral Y direction, assuming sufficient rigidity of the structure of the fuselage 2 in the area considered and of the central wing box 31.

At least two roller assemblies for each beam are necessary to hold the central wing box 31 without uncontrolled motion being possible relative to the beams, but a larger number of such roller assemblies is possible, in particular for reasons of design safety, for example three roller assemblies per beam as illustrated in the Figures.

Advantageously, some rollers or generally some means of guidance 36 are provided with means for taking up play so that the wing 3 is not subject during the flight to any significant displacement either in the vertical Z direction upward or downward, or laterally in the Y direction.

In such an arrangement, it is essential for each beam 25a, 25b to be perfectly fixed to the fuselage structure and to be as rigid as possible, to prevent deformations harmful to the sliding of the wing 3 in the X direction and uncontrolled motions of the wing in all directions relative to the fuselage.

The beams 25a and 25b are accordingly made of materials and with dimensions suitable for their fastenings to the forward and rear bulkheads 241 and 243, respectively, considering the forces that are to pass between the wing and the fuselage.

To improve the strength and rigidity of the beams 25a, 25b, said beams are advantageously integral with the fuselage structures located beneath said beams at points intermediate between the forward and rear bulkheads.

In this case, each beam 25a, 25b is connected by one or more connecting structures 26, having the form of vertical posts, for example, which are integral in their upper sections with the beam in question and that are integral in their lower sections with a structural platform 245, itself integral with frames 240 of the fuselage intermediate between the forward and rear bulkheads 241 and 243, respectively.

The structural bottom face surface 30 of the central wing box 31 that is located between the beams 25a, 25b and the structural platform 245 is accordingly necessarily traversed by the connecting structures 26.

An opening in the structural bottom face surface 30, not visible in the drawings, is provided at each connecting structure 26.

This opening has a form elongated along the longitudinal direction of displacement of the wing, and its dimensions are sufficient to prevent interference between the connecting structure 26 and the structural bottom face surface 30, regardless of the longitudinal position of the wing 3 relative to the fuselage 2.

Also, the structural connections are arranged in each beam and the structural platform 245, or other fuselage structures that can absorb forces, so that these connections by the choice of their positioning do not limit the desired amplitude of displacement of the wing 3 by interfering with the structure of the central wing box 31 or with the means of guidance 36 integral with said central wing box.

To modify the position of the wing 3 relative to the fuselage 2, one or more drivers 6 provide for the displacement and for holding the desired position of the wing along the X direction.

The driver(s) 6 act on the wing 3, advantageously at the central wing box 31, and preferably at the front spar 32 and/or at the rear spar 33, resting on structural elements of the fuselage 2.

In an example of embodiment corresponding to the illustrations, two front drivers are arranged in front of the central wing box 31 and act on the front spar 32, resting on a front support bulkhead 242 located in front of the forward bulkhead 241, and two rear drivers are arranged behind the central wing box 31 and act on the rear spar 33, resting on a support bulkhead 244 located behind the rear bulkhead 243.

This architecture that requires multiple drivers that may be of diverse technologies, in particular electrical or hydraulic, provide redundancy of the means for driving the wing.

Figure 4A:
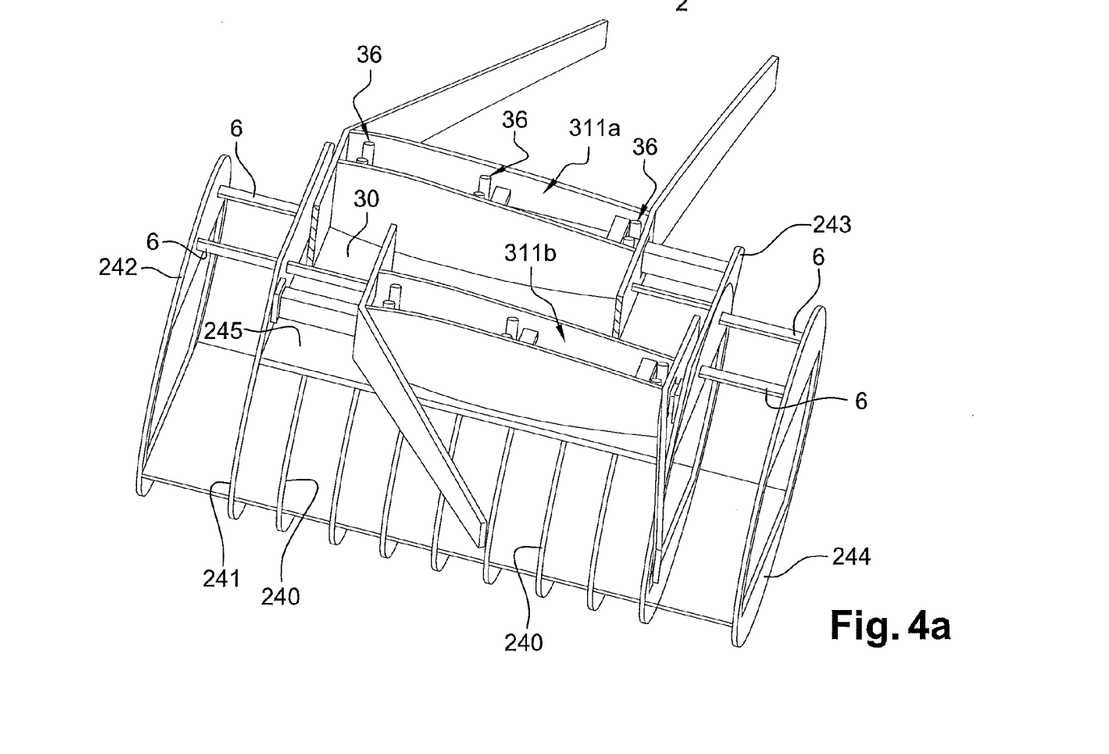
FIG. 4a: a perspective view similar to the sectional view of FIG. 3a, illustrating in an imaginary way a half-wing in extreme forward position and a half-wing in extreme rear position.
Figure 4B:
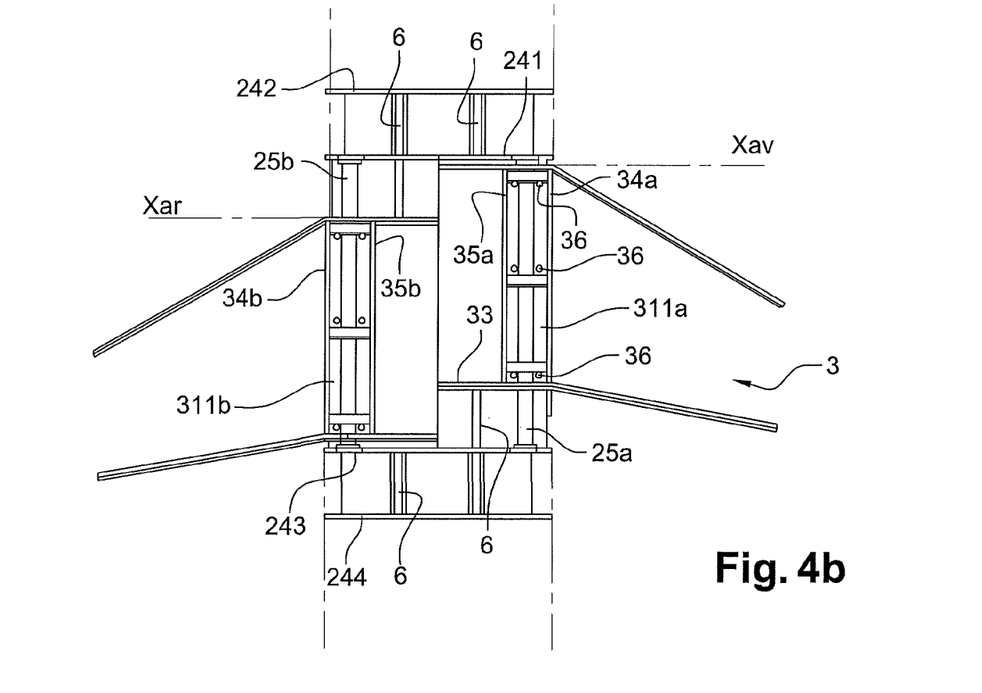
Figure 5A:
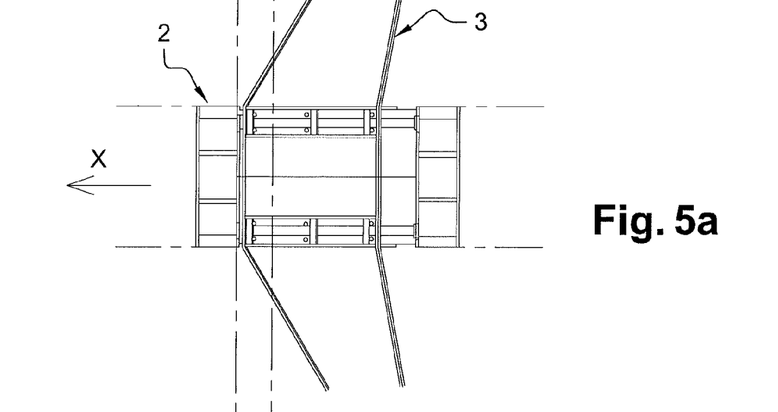
FIG. 5a: a view from above of a sectional view of the area of the fuselage at the junction with the wing, illustrating the wing in extreme forward position.

As illustrated in FIG. 5a in a view from above and on the right half-wing in FIGS. 4l and 4b, when the rear drivers 6 are in extended positions and the front drivers 6 are in retracted positions, the central wing box 31 at its front spar 32 is closest to the front bulkhead 241 and the wing is in the extreme forward position Xay.

Figure 5B:
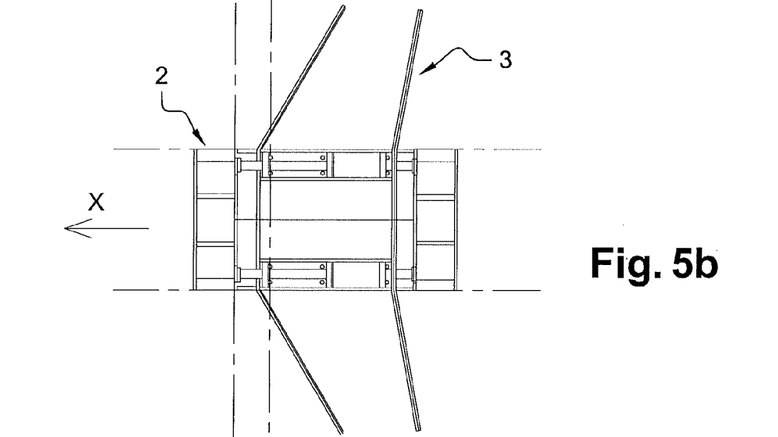
FIG. 5b: a view from above of a sectional view of the area of the fuselage at the junction with the wing, illustrating the wing in an intermediate position.
Figure 5C:
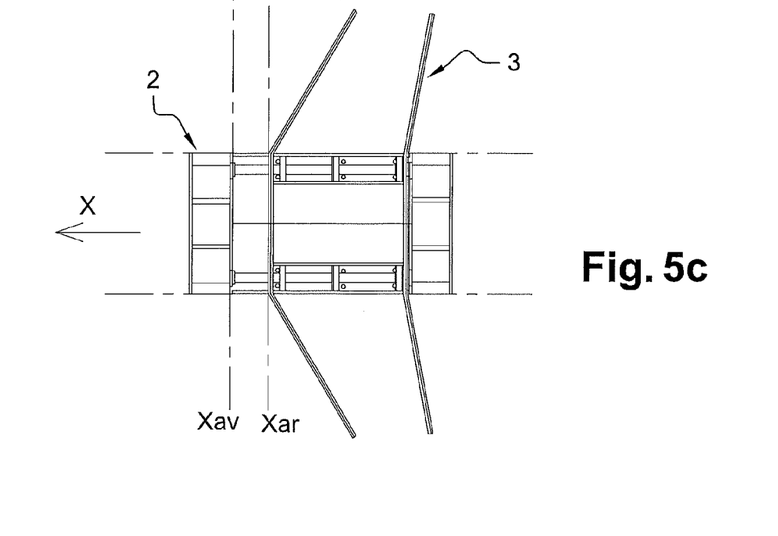
FIG. 5c: a view from above of a sectional view of the area of the fuselage at the junction with the wing, illustrating the wing in extreme rear position.

To the contrary, in FIG. 5c in a view from above and on the left half-wing of FIGS. 4a and 4b, when the rear drivers 6 are in retracted positions and the front drivers 6 are in extended positions, the central wing box 31 at its rear spar 33 is closest to the rear bulkhead 243 and the wing is in its extreme rearward position Xar.

Figure 3A:
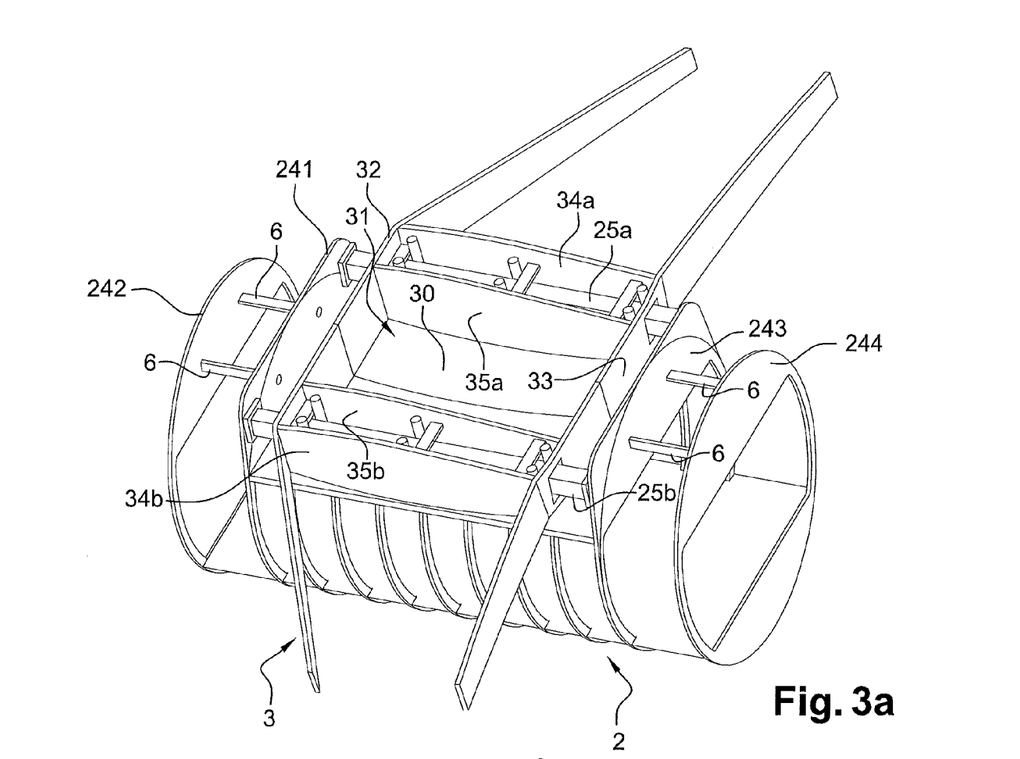
FIG. 3a: a perspective sectional view of the area of the fuselage at the junction with the wing, showing the principal elements of the structure.
Figure 3B:
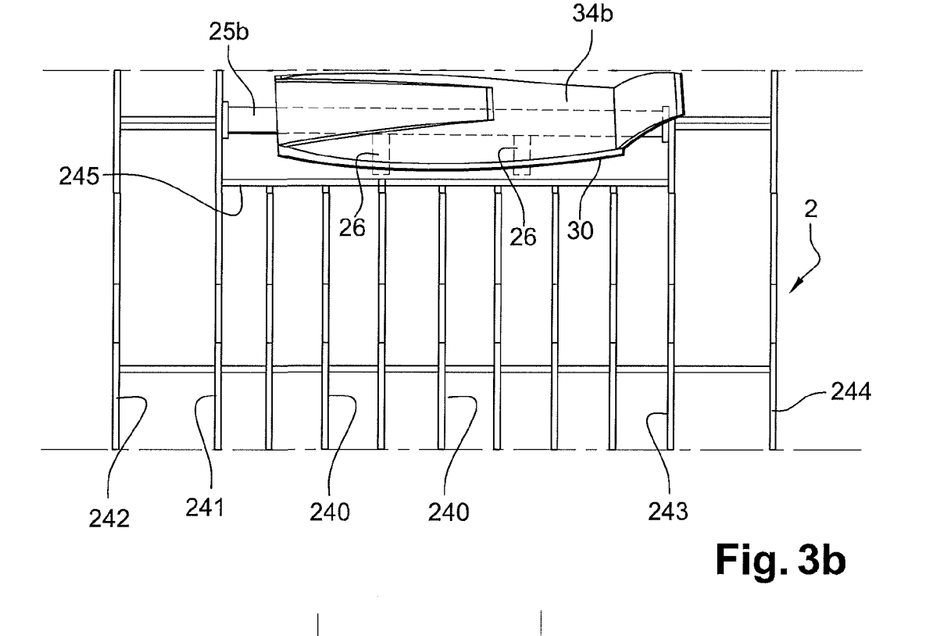

FIG. 5b in a view from above and FIGS. 3a and 3b show an intermediate position of the wing 2, with the front and rear drivers 6 being neither totally extended nor totally retracted.

The junction area between a wing and a fuselage of an aircraft is a sensitive region from the point of view of aerodynamic flow.

The forms desired for obtaining clean flow are generally obtained by aerodynamic covers determining the exterior forms of the junction area.

In the case of the aircraft 1 of the disclosed embodiments, the displacement of the wing 3 relative to the fuselage 2 leads to the use of a cover 7 integral with the wing 3 and that moves at the same time as the wing by sliding on the contact surfaces with the top of the fuselage 2.

Figure 6A:
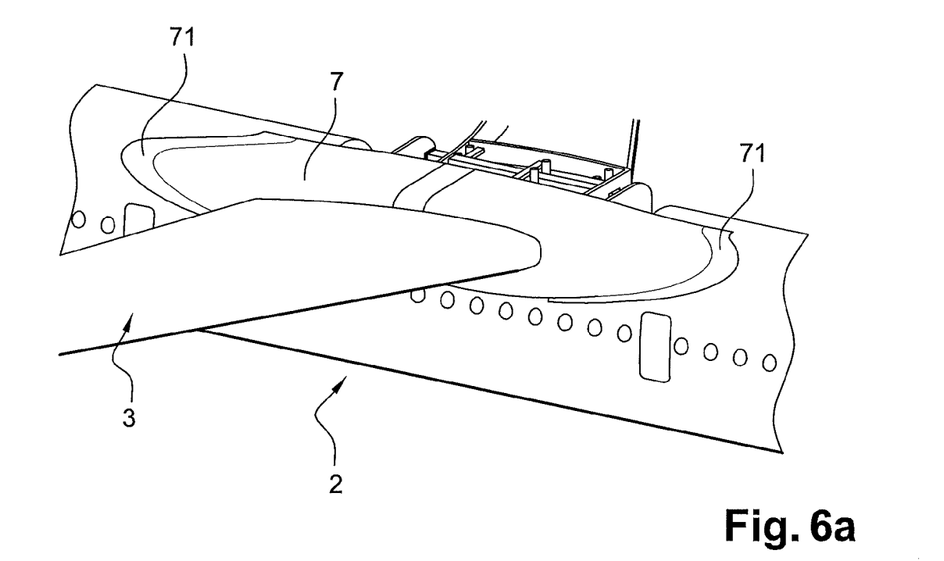
FIG. 6a: a perspective view of the area of the junction between the fuselage and the wing showing the wing-fuselage transition cover.
Figure 6B:
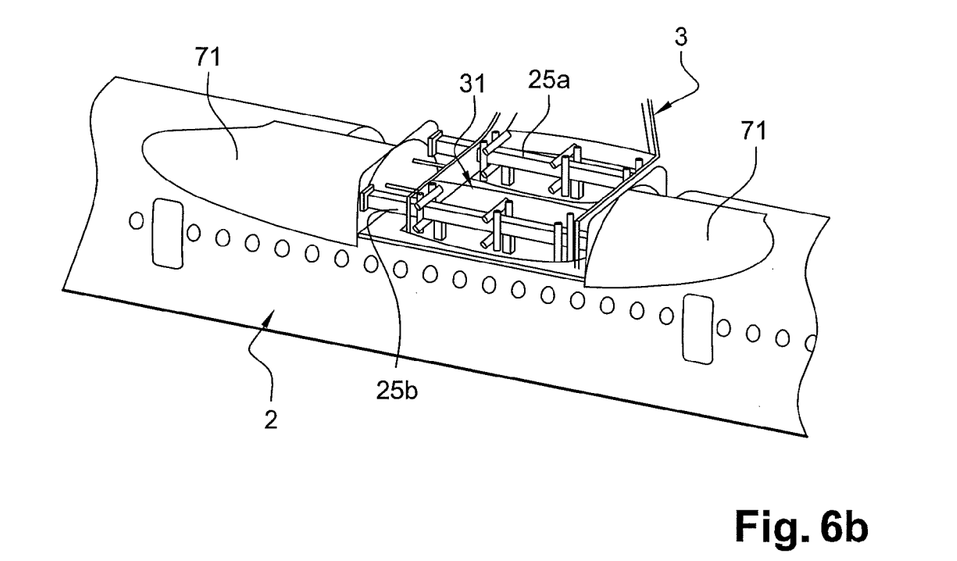
FIG. 6b: a view similar to the view of FIG. 6a with the cover retracted.

As illustrated in FIGS. 6a and 6b, to ensure sufficient air-tightness during the flight and to protect the material of the fuselage 2 against wear, which could cause repeated sliding of the cover, the fuselage 2 has guards 71 that extend said fuselage to cover the friction area for the entire amplitude of motion of the wing 3.

The detailed description given of an example of an aircraft 1 pursuant to the disclosed embodiments is not limiting, and one skilled in the art is able to adapt it to different aircraft architectures and to different modes of embodiment.

The fin assembly, as the case may be, thus has different numbers and forms of lift surfaces, particularly for the vertical fin.

The vertical fin is most often determined to respond to an engine failure situation involving severely asymmetric flight conditions. In this case, a conventional vertical fin 42d, provided with a trailing edge rudder as illustrated in FIG. 7b, can be used without modifying the principle of the disclosed embodiments.

Figure 7A:
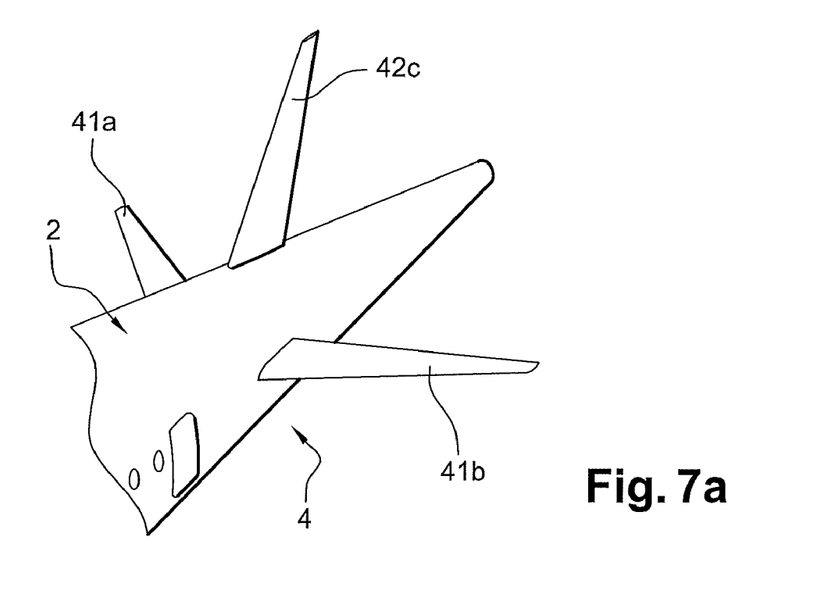
FIGS. 7a and 7b: perspective views of the rear section of the aircraft illustrating variants of the arrangement of tail fins.
Figure 7B:
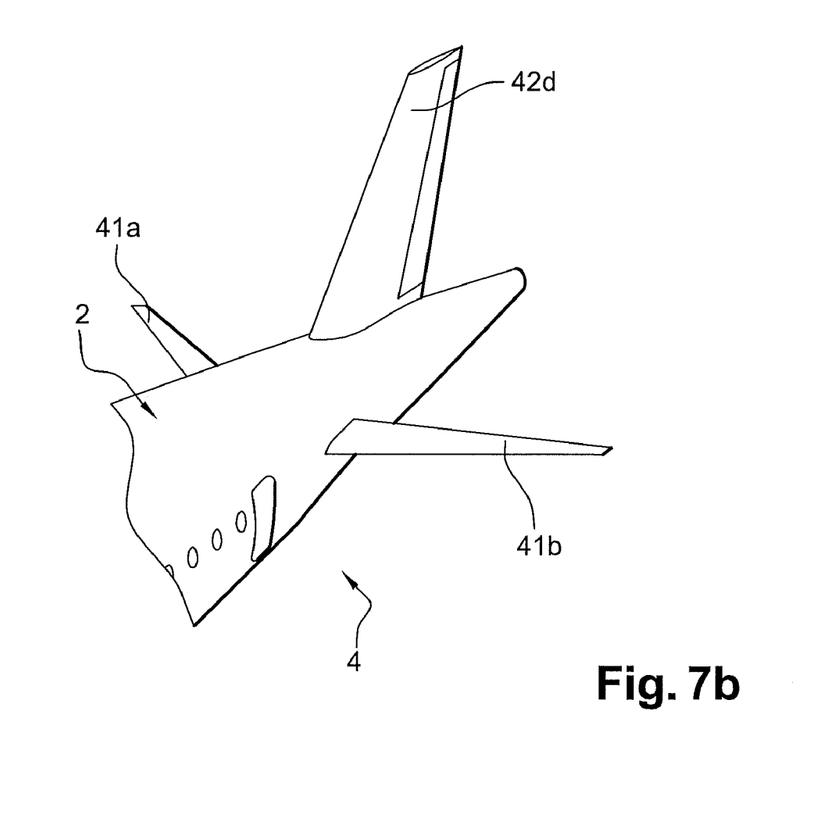

To the contrary, if the propulsive system does not produce significant asymmetry of thrust, for example in the case of jet engines fastened to the fuselage, a single saber rudder 42c in the vertical plane of the aircraft may prove to be sufficient, as illustrated in FIG. 7a, in which the jet engines are not shown.

In a form of embodiment not illustrated, the horizontal stabilizer is fastened in front of the tail in a canard configuration.

The number and arrangement of the engines are not imposed by the disclosed embodiments. However, it may prove advantageous to fasten the engines, two or more, beneath the wing 3 so that the movable weight of the wing is maximum and participates more effectively in the displacement of the center of gravity of the aircraft 1.

The disclosed embodiments do not insist that the wing 3 be mounted above the fuselage 2, and the disclosed embodiments can be implemented for other positions of the wing in height relative to the fuselage, as in the case of a wing mounted on the lower part of the fuselage and movable by a device at any point equivalent to that described in detail. In this case it is suitable to take into account the attachment of the landing gear, preferably to the wing, and to verify the balancing conditions when taxiing in the different positions of the wing.

The beams 25a, 25b along which the wing 3 slides can be of any shape that provides for the structural strength and rigidity necessary, and the means of guidance 36 for the wing 3 along the beams are adapted to the geometry of said beams.

Thus the asymmetry of maximum upward and downward forces for a transport aircraft permit considering the use of non-rectangular beams, for example with triangular or circular cross section, and of different means of guidance on the two sides, for example slide bars, grooved pulleys, or ball bearing guides, depending on the direction of the forces in question and the geometry of the beam cross sections.

There can also be more than two beams, for example three or four, and an architecture with more than four beams may prove to be advantageous with respect to structural design safety.

The drivers 6 can also be of any type that provide the desired amplitude of movements and that develop the forces necessary for the relative displacement of the wing 3 relative to the fuselage 2 in flight.

The drivers 6, for example, can be ball screws or linear displacement servocontrols.

The forces of the drivers are directly taken up in the variants of embodiments on the bulkheads, without making use of specific support frames.

For example, in a solution not shown, each driver is composed of a ball screw fastened without freedom of rotation around its axis to a spar of the central wing box and is driven in translation by a motor integral with the bulkhead, acting on the rotation of a screw of the ball screw.

The disclosed embodiments permit the implementation of an aircraft optimized with respect to the possibilities for balancing the aircraft in level flight, and by a permanent and precise adjustment of the position of the center of gravity of the aircraft relative to its point of application of the lift force of the aircraft without tail assembly, which permits reducing the dimensions of the fins solely for the needs of control and dynamic stability.

A gain is realized on the traversed surface of the structure and accordingly on the aerodynamic drag and on weight.

The invention claimed is:

1. An aircraft comprising:
   a fuselage,
   a wing integral with the fuselage at a point on a rigid central wing box, wherein sections of the wing are located on sides of the rigid central wing box and integral and fixed relative to the wing box to form a rigid wing, and
   a tail assembly integral with the fuselage,
   wherein the wing is mounted movably in translation relative to the fuselage along a longitudinal X direction of the aircraft essentially parallel to an axis of said fuselage between an extreme forward position Xav and an extreme rear position Xar of a point of reference of said wing,
   and wherein the rigid central wing box is determined in the front by a wing box front spar, in the rear by a wing box rear spar, and laterally by root ribs, wherein the sections of the wing comprise external front and external rear spars, the external front and external rear spars integral with and fixed relative to the wing box front spars and wing box rear spars to form the rigid wing.

2. An aircraft pursuant to claim 1 in which the wing is mounted movably relative to the fuselage through the intermediary of at least two parallel beams essentially parallel to the longitudinal axis of the fuselage, with said beams being integral with the fuselage.

3. An aircraft pursuant to claim 2 in which the beams traverse the rigid central wing box through openings in the wing box front spars and the wing box rear spars.

4. An aircraft pursuant to claim 3 in which the beams are integral with the fuselage at a forward bulkhead in front of the rigid central wing box and a rear bulkhead behind said rigid central wing box.

5. An aircraft pursuant to claim 1 in which means of guidance integral with the rigid central wing box and supported on the beams, permit movement of the wing toward the front and toward the rear essentially without displacement in the vertical or lateral directions of the aircraft.

6. An aircraft pursuant to claim 5 in which the means of guidance have rollers integral with the structures of the rigid central wing box and rest on the beams.

7. An aircraft pursuant to claim 5 in which two beams each traverse a secondary wing box of the rigid central wing box between a root rib and an internal rib on which are fastened all or part of the means of guidance.

8. An aircraft pursuant to claim 7 in which the beams have essentially rectangular cross sections and in which the rollers integral with the structure of the rigid central wing box have rollers with essentially horizontal axes and rollers with essentially vertical axes.

9. An aircraft pursuant to claim 1 in which at least one driver integral at a first extremity with the rigid central wing box and at a second extremity with a structure of the fuselage provides for the displacement and retention of the wing in position relative to said fuselage.

10. An aircraft pursuant to claim 9 in which the driver(s) is/are integral with a front support frame of the fuselage located in front of the forward bulkhead for a driver whose first end is integral with the rigid central wing box at the front spar, and/or is/are integral with a rear support frame of the fuselage located behind the rear bulkhead for a driver whose first extremity is integral with the rigid central wing box at the rear spar.

11. An aircraft pursuant to claim 10 in which the extreme forward Xav and rear Xar positions of the point of reference of the wing relative to the fuselage are such that the center of gravity of the aircraft and the point of application of the aerodynamic lift force of the aircraft without tail assemblies can be maintained along the longitudinal X direction at an essentially constant distance Dgp regardless of the loading of the aircraft and the allowed point of flight of the aircraft from a flight domain.

12. An aircraft pursuant to claim 11 in which the distance Dgp is such that the aerodynamic lift force of the lift surface of the horizontal stabilizers of the tail assembly is essentially zero for the needs of static longitudinal balancing in pitch around an axis parallel to the Y axis of the aircraft.

13. An aircraft pursuant to claim 12 in which the horizontal stabilizers are composed of monobloc saber rudders hinged relative to the fuselage, with the dimensions of said rudders being governed by dynamic control and stability criteria of the aircraft.

* * * * *